US011897220B2

(12) United States Patent
Kramer

(10) Patent No.: US 11,897,220 B2
(45) Date of Patent: Feb. 13, 2024

(54) METHOD FOR MEASURING OR CALIBRATING UTENSILS USED IN A PRESS

(71) Applicant: Dietmar W Kramer, Auslikon (CH)

(72) Inventor: Dietmar W Kramer, Auslikon (CH)

( * ) Notice: Subject to any disclaimer, the term of this patent is extended or adjusted under 35 U.S.C. 154(b) by 77 days.

(21) Appl. No.: 17/594,186

(22) PCT Filed: Feb. 14, 2020

(86) PCT No.: PCT/EP2020/053938
§ 371 (c)(1),
(2) Date: Oct. 6, 2021

(87) PCT Pub. No.: WO2020/207645
PCT Pub. Date: Oct. 15, 2020

(65) Prior Publication Data

US 2022/0152967 A1 May 19, 2022

(30) Foreign Application Priority Data

Apr. 9, 2019 (CH) ........................................ 475/19

(51) Int. Cl.
*B30B 11/00* (2006.01)
*B30B 11/02* (2006.01)
*B30B 15/00* (2006.01)

(52) U.S. Cl.
CPC .......... *B30B 11/005* (2013.01); *B30B 11/007* (2013.01); *B30B 11/02* (2013.01); *B30B 15/0094* (2013.01)

(58) Field of Classification Search
CPC .................................................... B30B 11/005
See application file for complete search history.

(56) References Cited

U.S. PATENT DOCUMENTS 5,517,871 A * 5/1996 Pento .................... B30B 11/005 73/865.9
6,074,584 A * 6/2000 Hinzpeter ............ B30B 11/005 264/40.5
6,442,859 B1 9/2002 Hinzpeter et al.
7,429,049 B2 9/2008 Kramer
(Continued)

FOREIGN PATENT DOCUMENTS

DE 10041237 A1 3/2002
EP 0902509 A1 3/1999
(Continued)

*Primary Examiner* — Katrina M Stransky
*Assistant Examiner* — Jared O Brown
(74) *Attorney, Agent, or Firm* — Brian Roffe

(57) ABSTRACT

In a method for measuring or calibrating utensils, in particular in pressing processes, different dimensions and/or positions of the utensils, such as tools, stamps, die units, chucks or the like, are determined. A measuring device is provided, with which the utensils are placed relative to one another in the press as in the installed state and are displaceable relative to one another at least in the axial direction of the opening in the die unit forming the die and are measured and/or calibrated individually and relative to one another. The pressed parts and workpieces to be produced using a press can thus be manufactured in a highly precise manner, moreover in high numbers using the same utensils.

12 Claims, 3 Drawing Sheets

(56) References Cited

U.S. PATENT DOCUMENTS

| | | | | |
|---|---|---|---|---|
| 8,668,483 | B2 * | 3/2014 | Mercado | B30B 15/306<br>425/138 |
| 10,071,455 | B2 * | 9/2018 | Iwamoto | G01B 21/16 |
| 10,899,100 | B2 | 1/2021 | Kramer | |
| 2006/0032283 | A1 * | 2/2006 | Thomae | B21D 28/00<br>72/20.1 |
| 2007/0096351 | A1 * | 5/2007 | Pannewitz | B30B 15/0094<br>425/168 |
| 2007/0251286 | A1 * | 11/2007 | Baltruschat | B30B 15/0041<br>72/179 |
| 2018/0328858 | A1 | 11/2018 | Velayutham | |
| 2021/0291474 | A1 * | 9/2021 | De Santis | B30B 15/026 |

FOREIGN PATENT DOCUMENTS

| | | | |
|---|---|---|---|
| EP | 1048450 | A2 | 11/2000 |
| EP | 1782943 | A2 | 5/2007 |
| EP | 1903645 | A1 | 3/2008 |
| WO | 2016139151 | A1 | 9/2016 |
| WO | 2020207645 | A1 | 10/2020 |

* cited by examiner

METHOD FOR MEASURING OR CALIBRATING UTENSILS USED IN A PRESS

FIELD OF THE INVENTION

The invention relates to a method and measuring device for measuring or calibrating utensils, in particular in pressing processes, with which different dimensions or positions of the utensils, such as tools, stamps, die units, chucks or the like, can be determined.

BACKGROUND OF THE INVENTION

A powder press in accordance with the printed specification WO-A-2016/139151 is preferably provided with a plurality of stamps for a transverse press which can be displaced in a chuck housing, which partially delimit a cavity of a die in the chuck housing. Assigned to the stamps is an adjustable positioning means for the securing of their pressing positions, which is formed from a wedge assembly with a contact surface, placed transversely to the displacement movement direction of the stamp. This wedge assembly comprises at least one wedge, with the contact surface, which is adjustable transverse to the displacement direction of the stamp, and which is in contact with a contact surface at the punch. With such a wedge assembly it is possible on the one hand for a very precise press position of these stamps to be achieved, and, on the other, an extremely stable positioning of the stamps which are to be pressed under high pressures. However, it cannot be guaranteed in this case that the upper stamp and the lower stamp, which together with the transversely displaceable stamps form the enclosed die, can likewise be positioned with absolute precision.

OBJECTS AND SUMMARY OF THE INVENTION

Taking such a known press as a starting point, the invention is based on the object of providing a method and an associated measuring device by means of which the precision of the tools and blanks being manufactured can be increased, and, in this situation, the constancy of the high precision can be retained over a large number of tools and blanks being manufactured.

This object is solved according to the invention by a method for measuring or calibrating utensils for presses that include a die unit forming a die and having an opening wherein a measuring device is arranged separately from the press and includes at least one stand having at least one lower plate, at least one upper plate above the at least one lower plate, and at least one measuring table between the at least one lower plate and the at least one upper plate. Utensils are placed in the press in relation to one another in an installed state and to be movable relative to one another at least in an axial direction of the opening of the die unit forming the die. Using the measuring device, the utensils are measured or calibrated in relation to one another to obtain measurements or calibrations about the utensils. The utensils are identified to obtain identifications of the utensils, and the obtained measurements or calibrations are stored in associations with the obtained identifications of the utensils to enable subsequent use for operation in the press. A measuring or calibrating device for utensils for presses, for use in this method, includes at least one stand separate from the press, at least one plate, and at least one measuring table spaced from the at least one plate, and a respective chuck secured onto each stand and plate and configured to position the utensils.

In order to implement the method according to the invention, a measuring device is provided, wherein the utensils are placed in the press in relation to one another as in the installed state, and can be displaced relative to one another at least in the axial direction of the opening of the die unit which forms the die, and are measured individually and/or calibrated against one another, wherein the utensils are identified and the measurements and/or calibrations are stored and then used for operation in the press.

With this method according to the invention, the blanks and workpieces to be manufactured with the press can be produced with high precision and in large numbers, with the same utensils.

In addition to this, the setting time of the utensils measured or calibrated in accordance with the method can be shortened when used in particular in a press, since this takes over the preliminary measuring and calibrating of the utensils in the press, and the manufacture can begin after just a few operational procedures at the installation of the utensils. In this situation, the setting quality and precision are likewise improved despite the shorter time involved in the machine setting.

Very advantageously, a force measurement is provided for with the die unit, preferably by means of a plurality of force sensors at least in the axial direction of the opening of the die unit, and, in addition to this, the physical contact is electrically detected during the displacement of the one utensil into the following utensil, in particular of the one stamp into the opening of the die unit, and therefore the contact position of the utensil which can be displaced into the opening of the die unit is determined with extreme precision.

The invention further extends to a calibration of the contact position of a utensil in the opening of the die unit by a manual or automated control and/or regulation, wherein the utensil is introduced into the opening, and, as soon as the utensil comes in contact with the wall of the opening of the die unit, on the one hand a rise in force at the die unit or the stamp is measured, and, on the other, the electric contact takes place, and from this the contact position of the utensil can be determined with extreme precision, and the possibility can therefore be prevented of the stamp, when in operation, impacting with excessive force into the opening or the die, and damage being incurred to the edge of the stamp and possibly of the inner wall of the die unit which comes in contact with it.

According to the invention, the measuring device comprises at least one stand or at least one column, with at least one lower and one upper transverse carrier, and at least one measuring table which is height-adjustable between these carriers at the stand, preferably assigned to which is in each case a chuck for the positioning of the utensils. Advantageously, a die unit can be secured as a utensil to the measuring table. The preferably plurality of force sensors for determining the force pressure in the adjustment direction of the measuring table are advantageously arranged underneath the chuck. In addition to this, an optical micrometer is provided, which emits optical light signals transversely to the adjustment direction of the measuring table, and this is a length scale for measuring the planes of the utensils which serve as reference positions.

With this configuration of the measuring device it is possible for all the necessary measurements and calibrations of the utensils to be carried out individually and in relation to one another with maximum precision.

BRIEF DESCRIPTION OF THE DRAWINGS

The invention and further advantages thereof are explained in greater detail hereinafter on the basis of exemplary embodiments and by making reference to the drawings. The Figures show.

DETAILED DESCRIPTION OF THE INVENTION

Figure 1:
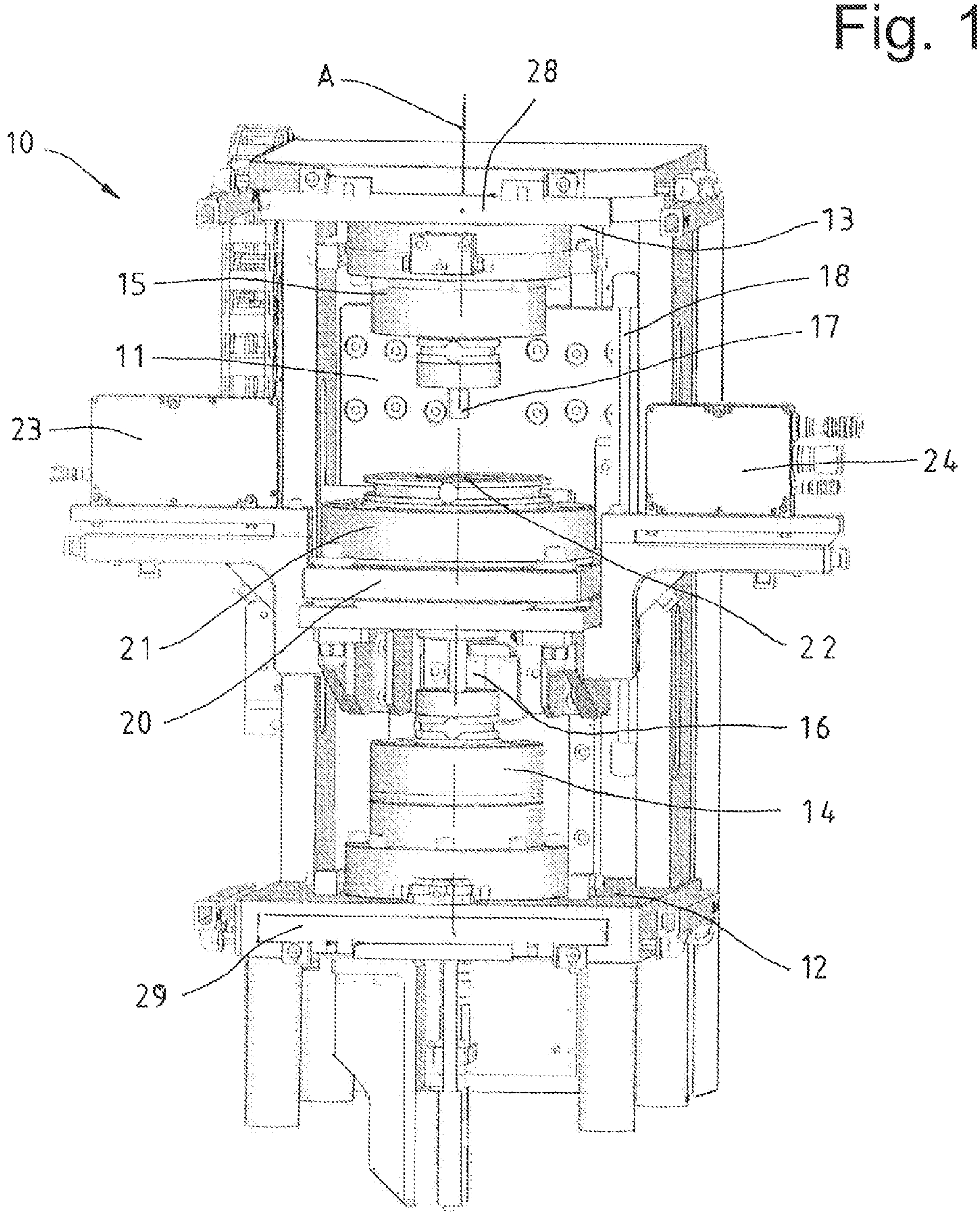
FIG. 1 is a perspective front view of a measuring device according to the invention.

FIG. 1 shows a measuring device 10, with a vertically arranged stand 11, secured to this a lower and an upper receiving plate 12, 13, and between these, at the stand 11, is a height adjustable measuring table 20. Secured on or underneath the respective receiving plate 12, 13, and on the measuring table 20, is in each case preferably a chuck 14, 15, 21, for the positioning of the utensils, wherein this chuck can be replaced by others with different dimensions, depending on the utensils which are to be used.

With this measuring device 10, it is possible for utensils to be measured or calibrated, in particular with pressing, wherein this relates to tools, stamps 16, 17, die units 22, and the chuck 14, 15, 21 or the like. With the presses, blanks are produced from iron powder, carbide metal powder, or ceramic powder for the most widely differing tools or for parts in general mechanical engineering, such as valves, engine parts, bearing sleeves, or the like.

With the method according to the invention, with this measuring device 10 the utensils are placed in the press in relation to one another as in the installed state, and can be displaced relative to one another in the axial direction A of the opening of the die unit 22, forming the die, and they are measured and/or calibrated individually and in relation to one another. Previously or following this, the utensils are identified and the measurements and/or calibrations are stored, and used for the machining in the tool production or for operation in the press.

For this identification use can be made of conventional commercial barcode readers and/or RFID readers, which, for example, are stored in a databank in a computer and can then be called up again, which is not represented in any greater detail.

The utensils can therefore be measured in the same positions as in the operational state, and calibrated in relation to one another, as is explained in greater detail hereinafter. These utensils can therefore be put into position still more precisely, and the blanks which are to be produced are produced correspondingly more precisely in series production.

Secured to the measuring table 20 is a die unit 22, as a utensil in the chuck 21. Arranged underneath this chuck are preferably several force sensors for determining the force pressure in the adjustment direction of the measuring table or in the axial direction of the opening of the die unit 22.

Provision is also made for a micrometer, consisting of a transmitter 23 and a receiver 24, which are arranged on one side at the measuring table 20. This transmitter 23, which is also referred to as or may be an optical micrometer, emits optical light signals transversely to the adjustment direction of the measuring table, which are evaluated by the receiver 24 (which is also referred to as or may be an optical micrometer), and thereby positions of the utensils can be measured by light/shadow edges.

In addition to this, a longitudinal scale 18 is provided, aligned in the adjustment direction of the measuring table 20, for measuring the planes of the utensils which serve as reference positions, for which use is made preferably of a high-precision glass scale with a precision of less than 0.001 millimeters.

Moreover, located at the outer circumference of the upper and lower receiver plates 12, 13, are light barriers 28, 29, communicating with one another, which serve as safety measures for the operating personnel. In the event, that during a measurement process, the user were to leave his hands between these receiver plates 12, 13, inside the light curtain formed in this way, the measuring device 10 would stop immediately.

Figure 2:
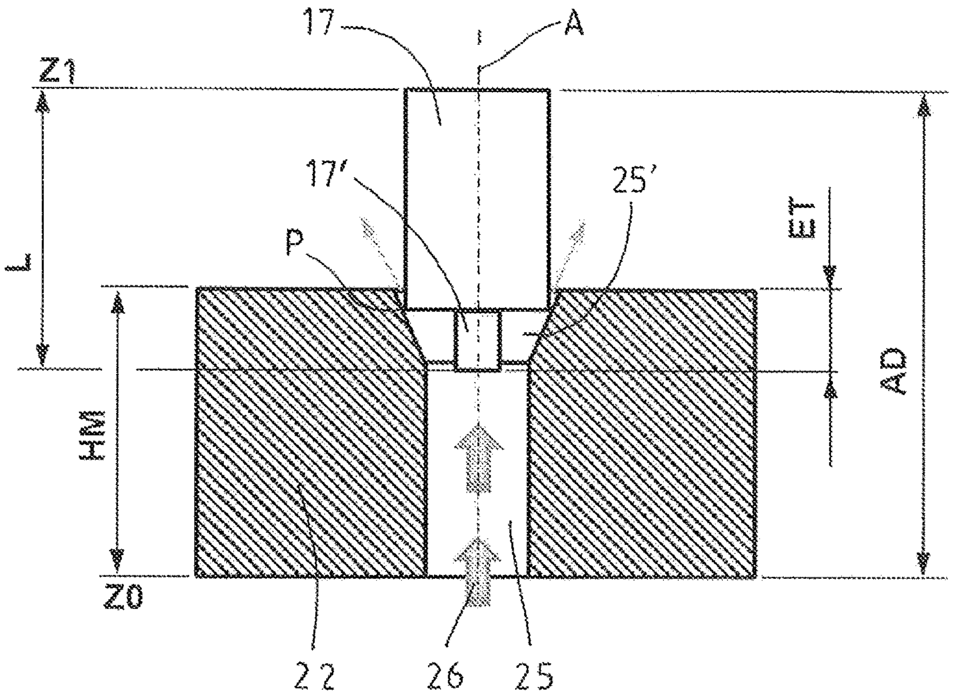
FIG. 2 is a schematic section through a die unit, and a view of an upper stamp located in a contact position with this, as utensils.

Shown in FIG. 2, on the one hand, are the dimensions of the utensils which are to be determined, and, on the other, a calibration of the contact position P of a utensil in the opening 25 of the die unit 22.

This contact position P of a utensil in the opening 25 of the die unit 22 is detected by a manual or automated control and/or regulating procedure. The utensil provided as the upper stamp 17 is introduced into the opening 25 coaxially to this, in the axial direction A, by moving the measuring table 20 upwards, preferably at a low movement speed, which can also take place in increments, and is moved into what is referred to as the contact position P, as represented, which corresponds to the operating position in a press, for example, in which the full pressing force is exerted onto the powder material filled into the die. This opening 25 is configured in this situation as having a cylindrical portion and an upper region 25' that is frusto-conical, and the outer diameter of the upper stamp 17 is selected in such a way that its lower edge, which is preferably somewhat rounded, projects by a few millimeters underneath the upper end of the die unit 22 in the wall of this opening 25. This upper stamp 17 is further provided with a lower pin 17' for the forming of a hole in the blank, or the like, which is to be formed.

In order to determine this contact position P as calibration, measurement is made, on the one hand, of the rise in force at the die unit 22 when the upper stamp 17 comes in contact with its lower edge in the wall defining the frusto-conical upper region 25' of the opening 25, and, on the other, an electrical contact is measured between the two. As soon as an increase in force or the electrical contact is detected, the movement of the measuring table 20 upwards is stopped.

For the detection of the electrical contact, the device generates current at the measuring table, in the milliampere range, from the upper stamp into the chuck, which is insulated downwards. As soon as a contact takes place as explained above, the current is conducted and the resultant voltage can be measured.

To this purpose, this stopping takes place at a predetermined reference value of the force. This therefore ensures that a certain pressing force is present, but it is not too powerful as to cause any undesirable material damage to the lower stamp edge or to the wall of the opening 25.

Very advantageously, this controlling and/or regulating process is repeated at least once, with the movement and placement of the utensil in the opening 25 of the die unit 22, and, if the same measurement result is obtained as with the first contact position, this is then stored and used when in actual operation. Conversely, if a deviation is detected in relation to the first measurement, the procedure must be repeated until the same measurement results are obtained.

With an automated controlling and regulating procedure, all the functions of the actuation of the measuring device, and the measuring and calibrating sequences, are carried out by a computer program using software.

With this additional measurement of the electrical contact between the utensil and the die unit, a form of security is likewise established, since as soon as a touch contact occurs the movement towards each other must be stopped. If only one force measurement were to be carried out, this could lead, due to possible measurement delays, to excessively powerful pressing, and to damage to the inner wall and/or the utensil, as has already been mentioned.

As is indicated by the arrow 26 in FIG. 2, a medium, preferably air, is blown into the opening of the die unit 22, in the contact position of the utensil, in order to determine whether the utensil is in contact with all-round sealing effect in the conical opening of the die unit. This opening 25 must be sealed in this situation. If this were not the case, the air flow occurring would be measured by means of flow measurement of the air volume per time unit. It could be the case, for example, that the upper stamp 17 does not run precisely coaxially to the opening 25, and then a slight gap would occur between them on one side, and this could be detected with such a measurement with the medium, since, in the presence of a gap, an air flow would occur through the opening. The alignment between the utensil and the die unit could then be corrected, and this measurement repeated. Such a gap could also occur due to imprecise manufacture of the utensils. With this flow measurement, the advantage is provided that the amount of time of the air flow can be measured, and therefore the size of the gap can also be determined.

According to the invention, the following measurements of the utensils can be determined and stored, in particular in the previously set contact position P. With the upper stamp 17 as the utensil, its entire length L is determined and stored, as are its upper reference position Z1 and its penetration depth ET in the contact position, in this case, with the die unit 22, the position Z0 of the under side serving as the reference, its height HM, and also the total distance AD of them both when in the contact position. It is of course also possible for additional values to be determined, but for the attaining of the degree of precision being sought in manufacture, these dimensions referred to are sufficient.

Figure 3:
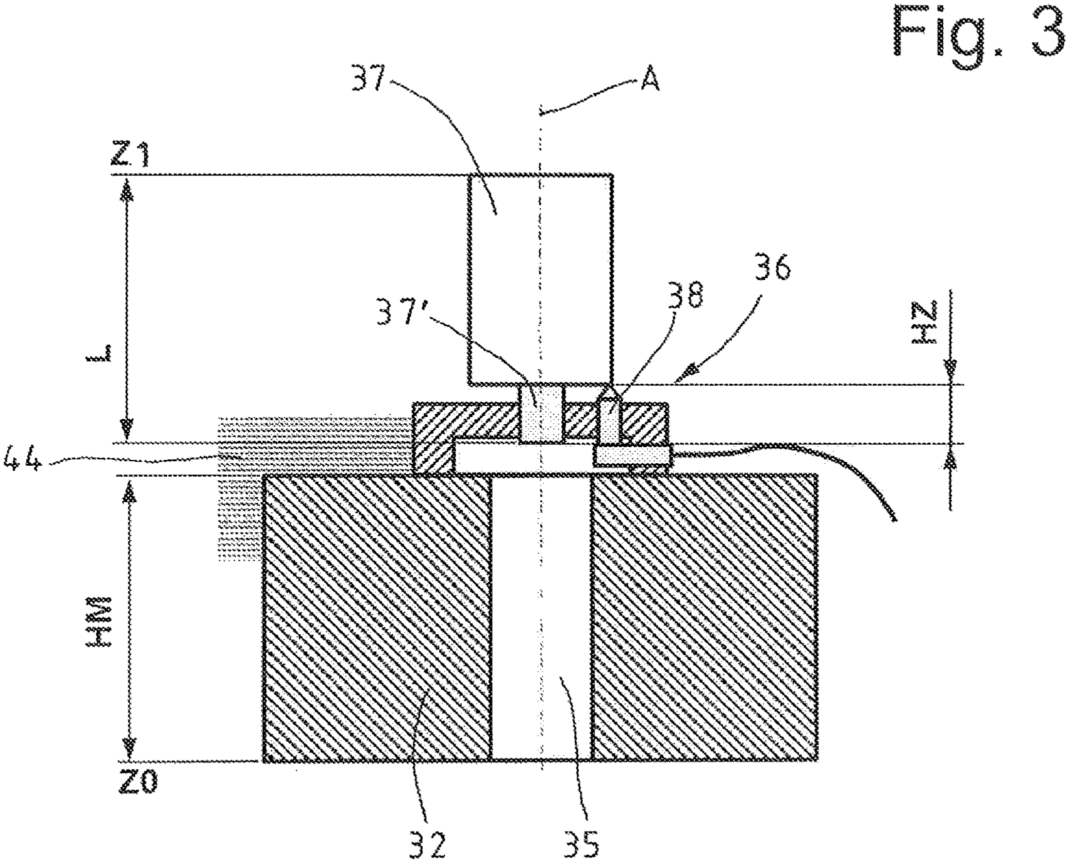
FIG. 3 is a further schematic section through a die unit and an upper stamp as utensils, and a measuring instrument on the die unit for measuring the upper stamp.

FIG. 3 shows another exemplary embodiment of utensils, in which a die unit 32 is used with a cylindrical opening 35 and a similarly shaped upper stamp 37 such as that according to FIG. 2. The upper stamp 37, when in operation, in the press or in the machine tool, is pressed upwards onto the die unit 32. Use is made of a measuring instrument 36, which can be mounted on the utensil, such as the die unit 32, with a measuring sensor or probe 38 for measuring out the at least one utensil, such as this upper stamp 37. With this measuring instrument 36, at least in relation to axial direction A, the under side of the upper stamp 37 is measured, comprising one or more surfaces, with a pin 37', and the distance interval to the upper side of the die unit 32. Optical light signals 44 from the optical micrometer are also indicated, which are explained hereinafter.

With this upper stamp 37 as a utensil, its entire length L is detected and stored, as well as its upper reference position Z1 and the pin length HZ, while with the die unit 32 the reference position Z0 on the under side and its height HM are also detected and stored.

Figure 4:
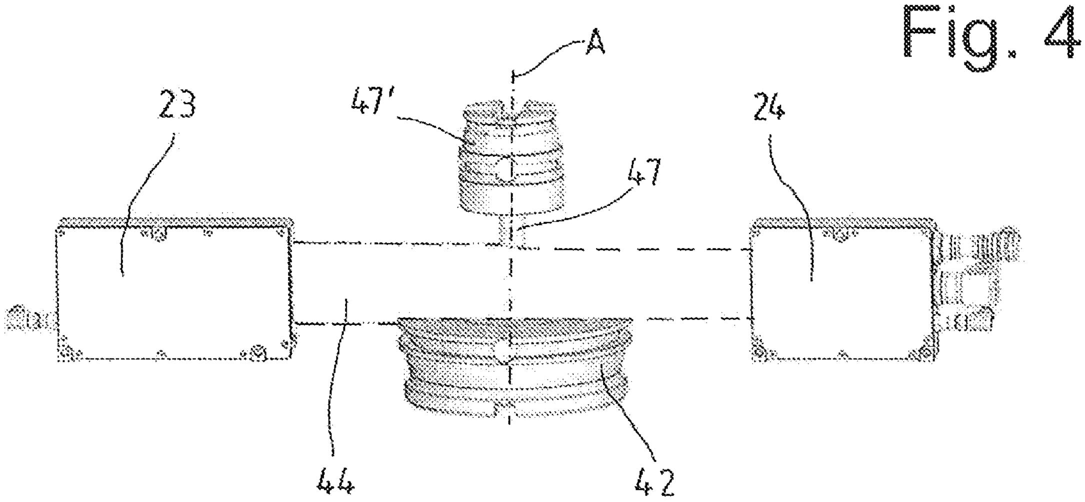
FIG. 4 is a perspective view of a die unit and an upper stamp as utensils, and an optical micrometer with a transmitter, and a receiver opposite this.

FIG. 4 shows this optical micrometer, consisting of the transmitter 23 and the receiver 24, which are placed on one side and the other of the die unit 42. Optical light signals 44 are emitted by the transmitter 23 transversely to the adjustment direction of the die unit 42 or to the axial direction A, preferably laser beams, in a flat manner in the direction towards the receiver 24 opposite, which detects the beams passing through and forms measured values from them. It can be seen that these flat light signals 44 which are generated pass only in the free region between the underside of the upper stamp 47 and the upper end surface of the die unit 42 as far as the receiver 24, and therefore the positions and the distance interval between the under side of the upper stamp 47 and the upper end surface of the die unit 42 can be measured. As a result, different positions of the utensils can be measured, individually or in relation to one another, rapidly and very accurately. Assigned to the upper stamp 47 is a clamping means 47', which can be tensioned, in a detachable manner, in a chuck, not shown in any greater detail, at the upper receiver plate 13 in accordance with FIG. 1. The die unit 42 in turn can be secured in a detachable manner in a chuck arranged on the measuring table 20.

Figure 5:
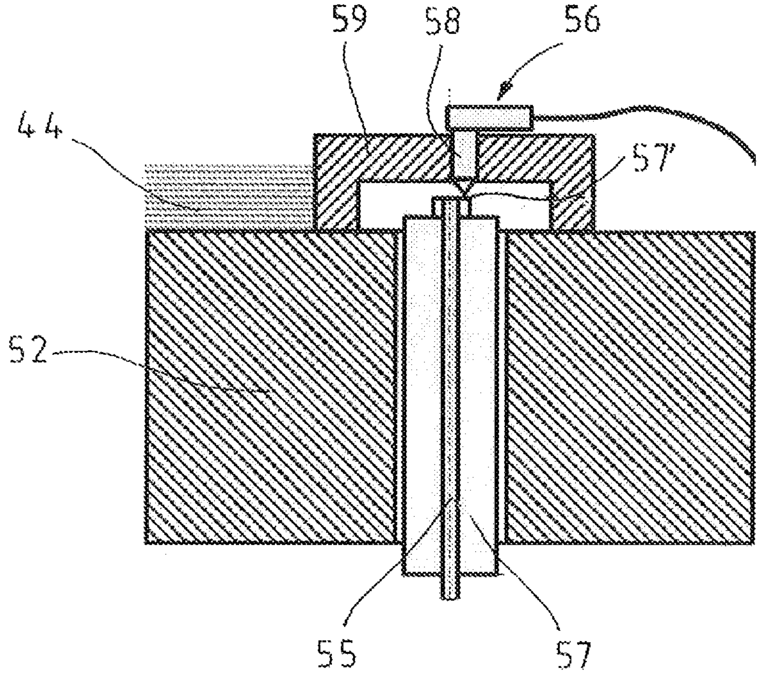
FIG. 5 is a schematic section through a die unit and a lower stamp as utensils, and a measuring instrument on the die unit for measuring the lower stamp on its upper side.

FIG. 5 again shows a measuring instrument 56, which can be located on the utensil, such as the die unit 52, with a sensor or probe 58 for measuring out the at least lower stamp 57, and a mandrel 55 which can be moved in it, as utensils. The measuring instrument 56 is arranged in holding means 59, which can be located on the die unit 52, in such a way that the probe 58 can be adjusted in the axial direction, and with this the irregular contour of the upper face side 57' of the lower stamp 57 and of the mandrel 55 can be measured. The latter is likewise held in clamping means which can be tensioned in a chuck. This lower stamp 57 exhibits a cylindrical shape and can be pushed through the opening of the die unit 52, and therefore the position of its upper face side 57' can be determined in relation to the lower reference position Z0 of the die unit 52.

This method according to the invention, with the measuring device as explained heretofore, can be used as a further advantage for any desired reference tensioning systems of presses or machine tools.

It is also suitable for multi-axis press tools with closed, open, and divided dies, such as is explained, for example, in the printed publication WO-A-2016/139151, referred to in the preamble. Correspondingly, an opening in the die unit can also be present, extending transversely to the adjustment direction, and utensils can be displaced relative to one another in this direction, and can be measured and calibrated in accordance with the invention.

With these lower and/or upper transverse plates or carriers 12, 13, assigned to the stand 11, and the at least one measuring table 20 arranged between them, advantageously the at least one measuring table 20 is arranged so as to be height adjustable at the stand 11, by means of a drive. However, it would also be possible, in reverse, for the transverse plates or carriers 12, 13 to be adjustable and for the measuring table 20 to be secured and stationary, or for both the transverse plates or carriers 12, 13 and also the measuring table 20 to be arranged as adjustable.

With the exemplary embodiment explained heretofore, this measuring device 10 is constructed as a separate device. Such a measuring device could, however, be integrated in a press, by means of which the utensils installed before the pressing could be measured and/or calibrated.

The method according to the invention can also be used with known service stations, with pre-adjustment devices on presses, or in machine tool construction, for checking and quality assurance.

The invention claimed is:

1. A method for measuring or calibrating utensils, used in a press, with which different dimensions or positions of the utensils can be determined, the press including a die unit forming a die and having an opening, the method comprising:

arranging a measuring device separately from the press, the measuring device including at least one stand having at least one lower plate, at least one upper plate above the at least one lower plate, and at least one measuring table between the at least one lower plate and the at least one upper plate;

placing the utensils in the measuring device in relation to one another in a state in which the utensils are to be installed in the press and arranging the utensils to be movable relative to one another at least in an axial direction of the opening of the die unit forming the die; then measuring or calibrating, using the measuring device, the utensils in relation to one another when in the installed state to obtain measurements or calibrations about the utensils, the step of measuring or calibrating, using the measuring device, the utensils in relation to one another when in the installed state comprising calibrating a contact position of one of the utensils in the opening of the die unit by continuously moving the one of the utensils toward the opening of the die unit until a rise in force is detected at the die unit as the one of the utensils comes into contact with a wall of the opening of the die unit;

identifying the utensils to obtain identifications of the utensils; and storing the obtained measurements or calibrations in associations with the obtained identifications of the utensils to enable subsequent use of the utensils in operation of the press, whereby the placing of the utensils and the measuring or calibrating of the utensils using the measuring device are performed before pressing.

2. The method according to claim 1, wherein the step of calibrating the contact position of the one of the utensils in the opening of the die unit by continuously moving the one of the utensils toward the opening until the rise in force is detected at the die unit as the one of the utensils comes into contact with the wall of the opening of the die unit comprises:

performing a force measurement at the die unit at least in the axial direction of the opening of the die unit; and determining the contact position of the one of the utensils moving into the opening of the die unit based on the performed force measurement.

3. The method according to claim 2, wherein the step of performing a force measurement is carried out at the die unit by a plurality of force sensors.

4. The method according to claim 1, further comprising:

repeating the step of calibrating the contact position of the one of the utensils in the opening of the die unit, the step of storing the obtained measurements or calibrations in association with the obtained identifications of the utensils to enable subsequent use of the utensils in operation of the press comprising storing the obtained measurements or calibrations only when the obtained measurements or calibrations are the same for multiple calibrating steps.

5. The method according to claim 1, wherein the opening has a frusto-conical upper region, the method further comprising blowing a medium into the opening of the die unit from below, in the contact position of the one of the utensils, in order to determine, by means of a throughflow of the medium, whether the one of the utensils is in all-round sealed contact with the frusto-conical upper region of the opening of the die unit.

6. The method according to claim 1, further comprising:

measuring or calibrating a plane of the utensils running perpendicular to an axial direction of the opening to be used as a reference position;

determining dimensions of at least one of the utensils and the die unit in the axial direction; and determining the position of the at least one of the utensils when at least partly present in the opening of the die unit or when pressing through the opening of the die unit and projecting from a rear side of the die unit.

7. The method according to claim 1, further comprising securing a respective chuck to the at least one stand, the at least one lower plate and the at least one upper plate, the respective chucks being used to position the utensils.

8. The method according to claim 1, wherein the step of placing the utensils in the measuring device in relation to one another in the state in which the utensils are to be installed in the press and arranging the utensils to be movable relative to one another at least in the axial direction of the opening of the die unit forming the die comprises placing the die unit in connection with the at least one measuring table and placing a stamp in connection with the at least one lower or upper plate.

9. A method for measuring or calibrating utensils used in a press, with which different dimensions or positions of the utensils can be determined, the press including a die unit forming a die and having an opening, the method comprising:

arranging a measuring device separately from the press, the measuring device including at least one stand having at least one lower plate, at least one upper plate above the at least one lower plate, and at least one measuring table between the at least one lower plate and the at least one upper plate;

placing the utensils in the measuring device in relation to one another in a state in which the utensils are to be installed in the press and arranging the utensils to be movable relative to one another at least in an axial direction of the opening of the die unit forming the die, the step of placing the utensils in the measuring device in relation to one another in a state in which the utensils are to be installed in the press and arranging the utensils to be movable relative to one another at least in the axial direction of the opening of the die unit forming the die comprising placing the die unit in connection with the at least one measuring table and placing a stamp in connection with the at least one lower or upper plate; then measuring or calibrating, using the measuring device, the utensils in relation to one another when in the installed state to obtain measurements or calibrations about the utensils, the step of measuring or calibrating, using the measuring device, the utensils in relation to one another when in the installed state comprising electrically detecting physical contact of the stamp with the die unit and determining a contact position of the stamp based on the electrical detection of physical contact between the stamp and the die unit by continuously moving the stamp toward the opening of the die unit until electrical contact between the stamp and a wall of the opening of the die unit is detected and then stopping the moving of the stamp toward the opening of the die unit;

identifying the utensils to obtain identifications of the utensils; and storing the obtained measurements or calibrations in associations with the obtained identifications of the utensils to enable subsequent use of the utensils in operation of the press, whereby the placing of the utensils and the measuring or calibrating of the utensils using the measuring device are performed before pressing.

10. The method according to claim 1, wherein the step of measuring or calibrating the utensils in relation to one another to obtain measurements or calibrations about the utensils further comprises measuring or calibrating the utensils individually.

11. The method according to claim 1, wherein the step of measuring or calibrating the utensils in relation to one another to obtain measurements or calibrations about the utensils further comprises measuring or calibrating all of the utensils to be used in the press prior to any pressing using the die unit.

12. The method according to claim 1, further comprising adjusting a height of the at least one measuring table relative to a height of the least one lower plate and the at least one upper plate.

* * * * *